(12) United States Patent  
Saito et al.

(10) Patent No.: US 11,713,513 B2  
(45) Date of Patent: Aug. 1, 2023

(54) SURFACE-TREATED STEEL SHEET FOR BATTERY CONTAINERS AND MANUFACTURING METHOD OF SURFACE-TREATED STEEL SHEET FOR BATTERY CONTAINERS

(71) Applicant: NIPPON STEEL CORPORATION, Tokyo (JP)

(72) Inventors: Mamoru Saito, Tokyo (JP); Takehiro Takahashi, Tokyo (JP); Kiyokazu Ishizuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 64 days.

(21) Appl. No.: 16/968,087

(22) PCT Filed: Feb. 6, 2019

(86) PCT No.: PCT/JP2019/004290  
§ 371 (c)(1),  
(2) Date: Aug. 6, 2020

(87) PCT Pub. No.: WO2019/159794  
PCT Pub. Date: Aug. 22, 2019

(65) Prior Publication Data  
US 2021/0025071 A1  Jan. 28, 2021

(30) Foreign Application Priority Data  
Feb. 14, 2018 (JP) .................... 2018-024441

(51) Int. Cl.  
*C25D 5/12* (2006.01)  
*H01M 50/124* (2021.01)  
(Continued)

(52) U.S. Cl.  
CPC ............. *C25D 5/12* (2013.01); *B32B 15/015* (2013.01); *C22C 19/03* (2013.01); *C25D 5/50* (2013.01);  
(Continued)

(58) Field of Classification Search  
None  
See application file for complete search history.

(56) References Cited

U.S. PATENT DOCUMENTS 4,910,096 A    3/1990  Junkers et al.  
2013/0209864 A1  8/2013  Kuniya et al.  
(Continued)

FOREIGN PATENT DOCUMENTS

JP    3-17916 B2    3/1991  
JP    2003-328158 A    11/2003  
(Continued)

*Primary Examiner* — Xiaobei Wang  
(74) *Attorney, Agent, or Firm* — Birch, Stewart, Kolasch & Birch, LLP (57) ABSTRACT

To provide a surface-treated steel sheet for battery containers excellent in workability while maintaining battery characteristics and liquid leakage resistance, and a manufacturing method thereof. A surface-treated steel sheet for battery containers according to the present invention includes a Ni—Co—Fe-based diffusion alloy plating layer on at least one surface of a base steel sheet, in which the diffusion alloy plating layer is consisted of a Ni—Fe alloy layer and a Ni—Co—Fe alloy layer, which are arranged sequentially from the base steel sheet side, the diffusion alloy plating layer has a Ni coating weight within a range of 3.0 g/m² or more and less than 8.74 g/m² and a Co coating weight within a range of 0.26 g/m² or more and 1.6 g/m² or less, with a total of the Ni coating weight and the Co coating weight being less than 9.0 g/m², when a surface of the diffusion alloy plating layer is analyzed by an X-ray photoelectron spectroscopy, Co: 19.5 to 60%, Fe: 0.5 to 30%, and Co+Fe:

(Continued)

20 to 70% in atom % are satisfied, and a thickness of the Ni—Fe alloy layer is within a range of 0.3 to 1.3 μm.

8 Claims, 3 Drawing Sheets

(51) Int. Cl.
    *B32B 15/01*     (2006.01)
    *C22C 19/03*     (2006.01)
    *C25D 5/50*     (2006.01)
    *C25D 7/00*     (2006.01)
    *H01M 50/133*     (2021.01)
    *H01M 50/128*     (2021.01)
    *H01M 50/119*     (2021.01)

(52) U.S. Cl.
    CPC ............. *C25D 7/00* (2013.01); *H01M 50/119* (2021.01); *H01M 50/124* (2021.01); *H01M 50/128* (2021.01); *H01M 50/133* (2021.01); *Y10T 428/12931* (2015.01); *Y10T 428/12937* (2015.01)

(56) References Cited

U.S. PATENT DOCUMENTS

| | | | |
|---|---|---|---|
| 2014/0050971 A1 | 2/2014 | Tomomori et al. | |
| 2018/0229476 A1* | 8/2018 | Unno | C25D 11/38 |
| 2020/0321566 A1* | 10/2020 | Nakano | C23C 28/02 |

FOREIGN PATENT DOCUMENTS

| | | |
|---|---|---|
| JP | 2009-129664 A | 6/2009 |
| JP | 2012-48958 A | 3/2012 |
| WO | WO 2012/147843 A1 | 11/2012 |

* cited by examiner

SURFACE-TREATED STEEL SHEET FOR BATTERY CONTAINERS AND MANUFACTURING METHOD OF SURFACE-TREATED STEEL SHEET FOR BATTERY CONTAINERS

TECHNICAL FIELD

The present invention relates to a surface-treated steel sheet for battery containers, and a manufacturing method of the surface-treated steel sheet for battery containers.

BACKGROUND ART

Conventionally, a Ni-plated steel sheet has been used as a surface-treated steel sheet for battery containers. The Ni-plated steel sheet is used for various battery containers such as battery cans of an alkaline manganese battery, a lithium ion battery, and a nickel hydride battery, from a viewpoint of excellent chemical stability of Ni. When manufacturing this Ni-plated steel sheet being a surface-treated steel sheet for battery containers, it is advantageous to employ a method in which plating is previously and continuously performed on a steel strip before being produced into a can, in terms of a manufacturing cost and uniformity of plating. For this reason, there are increasing cases where the Ni-plated steel sheet is subjected to deep-drawing press work to be used for a positive electrode can or the like being a container containing a positive electrode material, a negative electrode material, an electrolytic solution, and so on filled therein, and in which the Ni-plated steel sheet itself also functions as a positive electrode terminal.

When the Ni-plated steel sheet is used for a positive electrode can of a general alkaline battery, for example, in order to increase discharge characteristics, an inner surface of the positive electrode can is coated with a conductive coating material containing graphite, to thereby maintain contact with a positive electrode mixture. However, when an organic solvent-based coating material is used, there is a problem regarding environmental pollution, and when a water-based coating material is used, energy consumption for drying becomes a problem. Further, when the Ni-plated steel sheet is used for the positive electrode can, it is said that oxidation of Ni occurs with time, which increases a contact resistance to lower discharge characteristics, and besides, an alkali resistance (liquid leakage resistance) is not always satisfactory in some cases.

It is said that the above-described problems of the Ni-plated steel sheet are solved or improved by using a surface-treated steel sheet obtained in a manner that a Ni plating layer is further coated with a Co plating layer, for an inner surface of a positive electrode can of an alkaline battery. For example, Patent Document 1 to be described below proposes, as countermeasures against a problem regarding reduction in discharge characteristics caused by oxidation of a Ni plating layer, a positive electrode can obtained by forming a Co plating layer with 0.05 to 0.10 μm on a Ni plating layer of an inner surface.

Patent Document 2 to be described below proposes that, as an alkaline battery capable of maintaining further excellent discharge characteristics, an inner surface of a positive electrode can is formed by a multi-layered coating film composed of Ni plating as a lower layer and a Ni—Co alloy plating as an upper layer, in which a thickness of the Ni—Co alloy coating film is set to 0.15 to 0.25 μm, and a Co proportion in the alloy is set to 40 to 60%.

Patent Document 3 to be described below points out that when a plated steel sheet obtained in a manner that Co plating is only applied onto a Ni plating layer, is used for a container of a battery that uses a strong alkaline electrolytic solution, Co elutes with time and it becomes difficult to keep battery characteristics. In addition to that, Patent Document 3 to be described below describes that it is appropriate to form an outermost surface layer portion of a plating layer by a Ni—Co alloy layer, and a Co/Ni value according to Auger electron spectroscopic analysis on a surface of the Ni—Co alloy layer is controlled to fall within a range of 0.1 to 1.5.

Further, Patent Document 3 to be described below does not particularly limit a method of forming the Ni—Co alloy layer at the outermost surface layer of the plating layer, and it exemplifies the following methods of (i) to (iii).

(i) A method in which an alloy plating bath with Co/Ni that falls within a predetermined range is used to form a Ni—Co alloy plating layer on a surface of a steel sheet.

(ii) A method in which a Ni—Co alloy plating bath is used to form a Ni—Co alloy plating layer on a surface of a steel sheet, and then the layer is heat-treated to be subjected to thermal diffusion.

(iii) A method in which a Ni plating layer and a Co plating layer are formed in this order on a surface of a steel sheet, and then the layers are heat-treated to be subjected to thermal diffusion.

Patent Document 4 to be described below proposes a cold-rolled steel strip obtained in a manner that a Ni plating layer with 1 to 6 μm is formed, a Co plating layer with 0.01 to 1.0 μm is then formed, and after that, heat treatment is performed at 580 to 710° C. In Patent Document 4, although there is no explicit description regarding the application of this plated steel sheet, good stability of the steel sheet in an alkaline medium is described, so that it can be considered that the application for a battery can is suggested.

Patent Document 5 to be described below discloses a surface-treated steel sheet for a battery case in which, for example, a surface corresponding to a case inner surface has an Fe—Ni diffusion layer as a lower layer and an Fe—Co—Ni diffusion layer containing Fe of 4 to 70 mass % which is formed by making an Fe—Co—Ni alloy plating layer containing Co of 5 to 25 mass % to be subjected to diffusion treatment as an upper layer, and a surface corresponding to a case outer surface has an Fe—Ni diffusion layer as a lower layer and a Ni layer as an upper layer, as a surface-treated steel sheet for a battery case. Patent Document 5 insists that battery characteristics can be improved more when compared to a Ni-plated steel sheet. However, Patent Document 5 only specifies, in claim 1, the composition of the plating layer before performing the diffusion treatment regarding the upper layer. In view of the fact that Patent Document 3 clearly indicates that a battery performance fluctuates depending on the composition of the outermost surface layer portion of the plating layer, it should be said that Patent Document 5 does not present any information regarding a proper structure of a plating film.

A method of forming a Ni—Fe alloy layer through mutual diffusion of Ni—Fe by performing heat treatment on a Ni-plated steel sheet in order to improve adhesiveness and the like of a plating film of the Ni-plated steel sheet, is well-known before the application of Patent Document 4. If, as a method of heat treatment, the heat treatment is performed in a state where a coil of a plated steel sheet is tightly coiled, there is a case where a plating layer adheres to a plated surface and the like with which the plating layer is brought into contact, to thereby cause a surface defect. However, Patent Document 4 discloses that when the Co plating layer is formed on the Ni plating layer, the occurrence of such a defect in a process can also be suppressed.

As described above, as the application for a positive electrode can of an alkaline battery in particular, there are known not only the plated steel sheet obtained in a manner that the Ni plating layer is coated with the Co plating layer, but also the improved plated steel sheet obtained by making the Ni plating layer and the Co plating layer to be alloyed. Further, as a manufacturing method of the latter plated steel sheet, there is also known a method in which a plated steel sheet obtained in a manner that the Ni plating layer is coated with the Co plating layer is heat-treated to be alloyed.

PRIOR ART DOCUMENT

[Patent Document]
Patent Document 1: Japanese Laid-open Patent Publication No. 2009-129664
Patent Document 2: Japanese Laid-open Patent Publication No. 2012-48958
Patent Document 3: International Publication Pamphlet No. WO 2012/147843
Patent Document 4: Japanese Examined Patent Application Publication No. H3-17916
Patent Document 5: Japanese Laid-open Patent Publication No. 2003-328158

DISCLOSURE OF THE INVENTION

Problems to be Solved by the Invention

A surface-treated steel sheet for an alkaline battery can is required to have both discharge characteristics and liquid leakage resistance as a positive electrode current collector. When Ni—Co plating is used on an inner surface side of the can, there is an effect of suppressing increase in charge transfer resistance between the inner surface of the can and a positive electrode material due to storage and reduction in output of the battery, to thereby improve the discharge characteristics, when compared to the case of using Ni plating. In order to suppress the increase in the charge transfer resistance with time, it can be considered that a Co concentration at a surface of the plating is required to be 20 atom % or more. On the other hand, Co is easily dissolved in alkali, so that when the Co concentration at the surface is excessively high, the dissolution of Co promotes dissolution of Zn of a negative electrode material, and generation of gas caused by such dissolution may cause liquid leakage from the battery. For this reason, it is demanded to adjust the Co concentration at the surface of the plating to an optimum state in which both the suppression of the increase in the charge transfer resistance and the suppression of the dissolution of Co can be realized.

Besides, when plating cracks and base iron is exposed during working of a battery can, the liquid leakage resistance is lowered due to dissolution of Fe, so that it is demanded to secure workability such that the plating does not crack even if the steel sheet is worked into the battery can. However, in the above-described Patent Document 1 to Patent Document 5, although the discharge characteristics and the liquid leakage resistance of the Ni—Co plated steel sheet have been studied, sufficient studies have not been done from a viewpoint of can workability.

The present inventors conducted studies, and it was found out that the various plated steel sheets disclosed in the above-described Patent Document 1 to Patent Document 5 have large variations in battery performance after working.

As a result of investigating causes thereof, it was found out that, depending on a press-work method when shaping the battery can, the plating cracks, the base iron is exposed and the negative electrode material is dissolved, resulting in that the battery performance deteriorates.

Accordingly, the present invention has been made in view of the above-described problems, and an object of the present invention is to provide a surface-treated steel sheet for battery containers excellent in workability while maintaining battery characteristics and liquid leakage resistance, and a manufacturing method thereof.

Means for Solving the Problems

In order to solve the above-described problems, the present inventors conducted earnest studies regarding a configuration of plating which is difficult to crack while securing slidability without depending on conditions when performing working of a battery can. As a result of this, the present inventors found out that by forming a Ni—Fe alloy layer with a proper thickness on a steel base side of a plating layer, plating adhesiveness can be secured, and at the same time, by forming a hard Ni—Co—Fe layer on the Ni—Fe layer, a crack of plating can be suppressed. Further, the present inventors found out that in order to realize the state of the plating layer as described above, it is only required to actively diffuse Fe from the steel base into the plating layer.

The gist of the present invention completed based on such findings is as follows.

[1] A surface-treated steel sheet for battery containers comprising a Ni—Co—Fe-based diffusion alloy plating layer on at least one surface of a base steel sheet, wherein: the diffusion alloy plating layer is consisted of a Ni—Fe alloy layer and a Ni—Co—Fe alloy layer, which are arranged sequentially from the base steel sheet side; the diffusion alloy plating layer has a Ni coating weight within a range of 3.0 g/m$^2$ or more and less than 8.74 g/m$^2$ and a Co coating weight within a range of 0.26 g/m$^2$ or more and 1.6 g/m$^2$ or less, with a total of the Ni coating weight and the Co coating weight being less than 9.0 g/m$^2$; when a surface of the diffusion alloy plating layer is analyzed by an X-ray photoelectron spectroscopy, Co: 19.5 to 60%, Fe: 0.5 to 30%, and Co+Fe: 20 to 70% in atom % are satisfied; and a thickness of the Ni—Fe alloy layer is within a range of 0.3 to 1.3 μm.

[2] The surface-treated steel sheet for battery containers described in [1], wherein a ratio of the Co coating weight to the Ni coating weight in the diffusion alloy plating layer is within a range of 0.03 to 0.45.

[3] The surface-treated steel sheet for battery containers described in [1] or [2], wherein an average crystal grain diameter of the base steel sheet is within a range of 6 to 20 μm.

[4] A manufacturing method of a surface-treated steel sheet for battery containers comprising: a Ni plating step of using a predetermined Ni plating bath to form a Ni plating layer on at least one surface of a base steel sheet; a step of using a predetermined Co plating bath to form a Co plating layer on the base steel sheet having the Ni plating layer formed thereon; and an alloying treatment step of forming a diffusion alloy plating layer by making the base steel sheet having the Co plating layer and the Ni plating layer formed thereon to be subjected to alloying treatment of performing soaking for 10 to 45 seconds in an atmosphere of $N_2$+2 to 4% $H_2$ and in a temperature range of 715 to 850° C., wherein: a Ni coating weight in the Ni plating layer is set to fall within a range of 3.0 g/m$^2$ or more and less than 8.74 g/m² and a Co coating weight in the Co plating layer is set to fall within a range of 0.26 g/m² or more and 1.6 g/m² or less, with a total of the Ni coating weight and the Co coating weight being set to less than 9.0 g/m²; and a total thickness of the Ni plating layer and the Co plating layer is set to fall within a range of 0.3 to 1.3 µm.

[5] The manufacturing method of the surface-treated steel sheet for battery containers described in [4], wherein a ratio of the Co coating weight to the Ni coating weight is set to fall within a range of 0.03 to 0.45.

[6] The manufacturing method of the surface-treated steel sheet for battery containers described in [4] or [5], wherein an unannealed cold-rolled steel sheet is used as the base steel sheet.

[7] The manufacturing method of the surface-treated steel sheet for battery containers described in any one of [4] to [6], wherein when a surface of the diffusion alloy plating layer is analyzed by an X-ray photoelectron spectroscopy, Co: 19.5 to 60%, Fe: 0.5 to 30%, and Co+Fe: 20 to 70% in atom % are satisfied.

Effect of the Invention

As described above, according to the present invention, it becomes possible to provide a surface-treated steel sheet for battery containers excellent in workability while maintaining battery characteristics and liquid leakage resistance, and a manufacturing method thereof.

EMBODIMENTS FOR CARRYING OUT THE INVENTION

Hereinafter, preferred embodiments of the present invention will be described in detail while referring to the attached drawings. Note that in the present description and the drawings, components having substantially the same functional configurations are denoted by the same codes to omit overlapped explanation.

(Regarding Entire Structure of Surface-Treated Steel Sheet for Battery Containers)

Figure 1A:
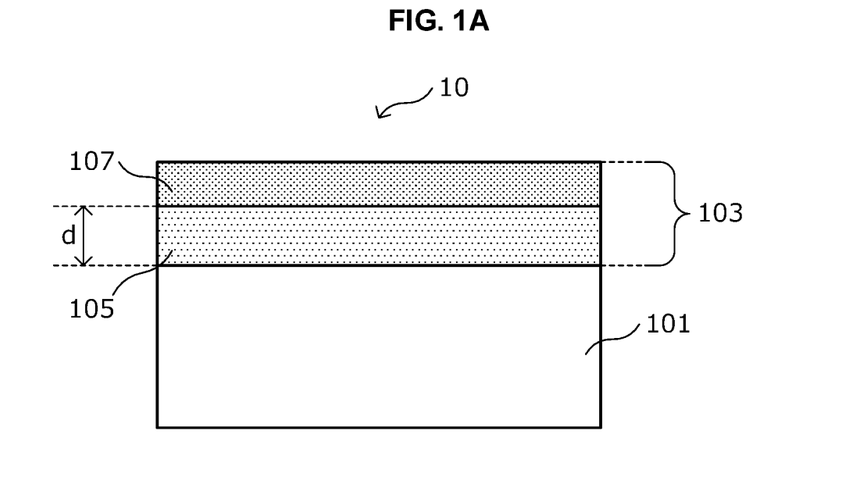
FIG. 1A is an explanatory diagram schematically illustrating a layer structure of a surface-treated steel sheet for battery containers according to an embodiment of the present invention.
Figure 1B:
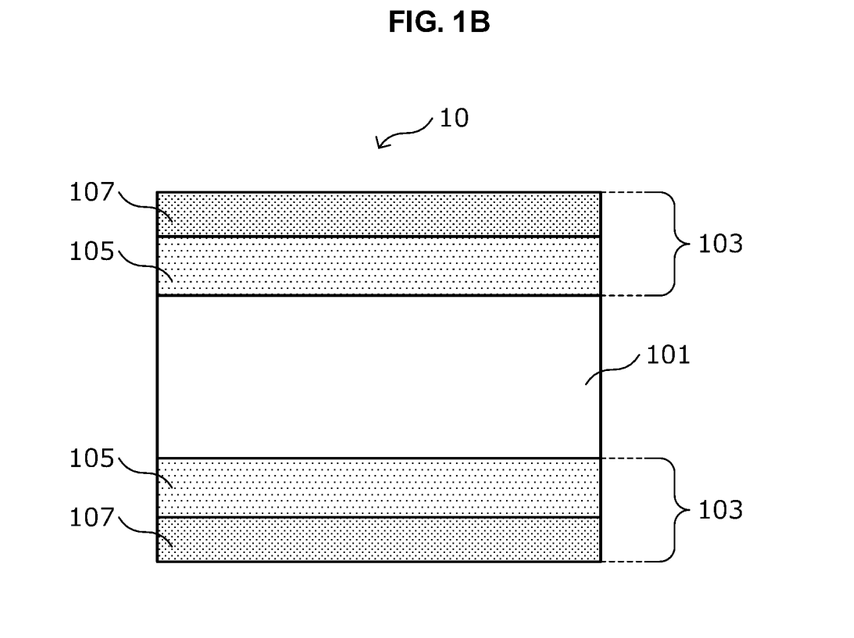
FIG. 1B is an explanatory diagram schematically illustrating a layer structure of the surface-treated steel sheet for battery containers according to another embodiment of the present invention.

First, an entire structure of a surface-treated steel sheet for battery containers according to an embodiment of the present invention will be described in detail while referring to FIG. 1A and FIG. 1B. FIG. 1A and FIG. 1B are explanatory diagrams each schematically illustrating a layer structure of a surface-treated steel sheet for battery containers according to the present embodiment.

As illustrated in FIG. 1A in a schematic manner, a surface-treated steel sheet 10 for battery containers according to the present embodiment has a base steel sheet 101, and a Ni—Co—Fe-based diffusion alloy plating layer 103 positioned on the base steel sheet 101. Further, in the surface-treated steel sheet 10 for battery containers according to the present embodiment, the diffusion alloy plating layer 103 may be provided on one surface of the base steel sheet 101 as illustrated in FIG. 1A, or it may also be provided on both surfaces of the base steel sheet 101 as illustrated in FIG. 1B.

Note that when the surface-treated steel sheet 10 for battery containers in which the diffusion alloy plating layer 103 is provided only on one surface of the base steel sheet 101 as illustrated in FIG. 1A is worked into the battery container, it is preferable to perform working so that the diffusion alloy plating layer 103 is positioned on a side to be an inner surface of the battery container.

Here, in the present embodiment, Ni plating and Co plating are sequentially performed on the base steel sheet 101, and then alloying is caused by heating, to thereby form the diffusion alloy plating layer 103, as will be described below in detail. By performing such treatment, the inside of the diffusion alloy plating layer 103 has a concentration gradient such that an Fe concentration is reduced from the base steel sheet 101 side toward an outermost surface layer of the diffusion alloy plating layer 103, and on the contrary, a Co concentration is reduced from the outermost surface layer of the diffusion alloy plating layer 103 toward a direction of the inside of the diffusion alloy plating layer 103.

Therefore, in the present embodiment, the "Ni—Co—Fe-based diffusion alloy plating layer 103" does not mean that the entire diffusion alloy plating layer 103 in a plating thickness direction is composed of a Ni—Co—Fe ternary alloy.

As a result of the realization of the concentration gradient as described above, the diffusion alloy plating layer 103 according to the present embodiment has a Ni—Fe alloy layer 105 positioned on the base steel sheet 101 side, and a Ni—Co—Fe alloy layer 107 positioned on a surface layer side of the surface-treated steel sheet 10 for battery containers, as schematically illustrated in FIG. 1A and FIG. 1B.

(Regarding Base Steel Sheet 101)

The base steel sheet 101 of the surface-treated steel sheet 10 for battery containers according to the present embodiment is not particularly limited, and it is possible to use various steel sheets such as normally-used aluminum-killed (Al-killed) steel or ultra-low carbon steel (for example, ultra-low carbon Ti-added steel, ultra-low carbon Ti—Nb-added steel, or the like). Further, as the base steel sheet 101 according to the present embodiment, it is also possible to use a steel sheet containing predetermined amounts of strengthening component elements of Si, Mn, P, and the like, a steel sheet containing B (boron) as a grain boundary strengthening element, or the like. Normally, a cold-rolled steel sheet is used as the base steel sheet 101 in view of a sheet thickness of a final product.

Here, in the base steel sheet 101 according to the present embodiment, a crystal grain diameter (average crystal grain diameter) is preferably 20 µm or less from a viewpoint of workability and surface roughening property. When the aluminum-killed steel is used as the base steel sheet 101, the crystal grain diameter is preferably 15 µm or less, more preferably 12 µm or less, and still more preferably 10 µm or less. When the ultra-low carbon steel is used as the base steel sheet 101, the crystal grain diameter is preferably 18 µm or less, more preferably 15 µm or less, and still more preferably 12 µm or less. In the ultra-low carbon steel, the crystal grain of the base material easily becomes coarse when compared to the aluminum-killed steel, but, the ultra-low carbon steel is excellent in formability (Lankford value, for example). Note that although a lower limit of the crystal grain diameter of the base steel sheet is not particularly limited, it is often difficult to set the lower limit to 5 µm or less, and further, even if the aluminum-killed steel is used, it is considerably difficult to set the lower limit to 3 µm or less.

Note that the above-described average crystal grain diameter can be measured in a manner as follows.

A cut steel sheet is embedded in a resin and subjected to nital etching, and then a L-cross section is observed by an optical microscope. At this time, a position of ¼ of a sheet thickness of the steel sheet is observed in a visual field (visual field area: 237.5 µm×316.3 µm) at 400 magnifications, for example, and a photograph is taken. Based on the obtained photograph, the average crystal grain diameter is determined by a section method. When the average crystal grain diameter is determined by the section method, three straight lines in total in a horizontal direction and diagonal directions of the photograph are drawn, and the number $n_L$ of crystal grains crossed by the straight lines is determined. At this time, the number of the crystal grain in which an end of the straight line exists is counted as ½. When a length of the straight line is set to L, an average crystal grain diameter $D=1.13 \times L/n_L$ is determined from ASTM E112-60T. D is determined from each of the straight lines, and an average value thereof is set to the average crystal grain diameter in the present embodiment.

(Regarding Diffusion Alloy Plating Layer 103)

As schematically illustrated in FIG. 1A and FIG. 1B, the diffusion alloy plating layer 103 according to the present embodiment is positioned on at least one surface of the base steel sheet 101. The diffusion alloy plating layer 103 according to the present embodiment contains the Ni—Co—Fe ternary alloy, as described above. Since the respective elements of Ni, Co, Fe exist so as to exhibit predetermined concentration gradients, the diffusion alloy plating layer 103 has the Ni—Fe alloy layer 105 and the Ni—Co—Fe alloy layer 107. When hardness of the Ni—Fe alloy and hardness of the Ni—Co—Fe alloy are compared, the Ni—Co—Fe alloy is harder than the Ni—Fe alloy. For this reason, when the Ni—Co—Fe alloy layer 107 is positioned on the Ni—Fe alloy layer 105, it becomes possible to improve the slidability.

<Ni Coating Weight>

In the diffusion alloy plating layer 103 having such a two-layer structure, a coating weight of Ni is within a range of 3.0 g/m² or more and less than 8.74 g/m². In the present embodiment, Ni has a function of (1) forming the Ni—Co—Fe ternary alloy at the surface layer portion of the diffusion alloy plating layer 103 to reduce the charge transfer resistance, and impart the liquid leakage resistance (for example, alkali solubility resistance) and the slidability, the above being required with respect to the surface-treated steel sheet for battery containers. Besides, Ni exhibits an effect of (2) forming the Ni—Fe alloy layer 105 with Fe diffused from the base steel sheet 101, to thereby increase the adhesiveness of the diffusion alloy plating layer 103 and suppress cracks of the diffusion alloy plating layer 103 during working.

When the coating weight of Ni is less than 3.0 g/m², it is not possible to form a sufficient Ni—Fe alloy layer 105, resulting in that the adhesiveness of the diffusion alloy plating layer 103, and the suppression of cracks of the diffusion alloy plating layer 103 during working become insufficient. On the other hand, when the coating weight of Ni becomes 8.74 g/m² or more, it becomes difficult to diffuse Fe up to the surface of the diffusion alloy plating layer 103 while maintaining the grain size of the base steel sheet 101 to the desirable range. Specifically, also in the case where the coating weight of Ni is 8.74 g/m² or more, it is possible to diffuse Fe up to the surface of the diffusion alloy plating layer 103 if a temperature and a time for the diffusion are given, but, the crystal grain growth of the base steel sheet 101 becomes excessive to coarsen the grains. As a result of this, a surface roughening resistance of the steel sheet, in particular, is reduced. Such a steel sheet in which the crystal grains become coarse and thus the surface roughening resistance is reduced, lacks compatibility as a steel sheet for containers.

In the present embodiment, the Ni coating weight of the diffusion alloy plating layer 103 is preferably 3.3 g/m² or more, and more preferably 3.5 g/m² or more. Further, the Ni coating weight of the diffusion alloy plating layer 103 is preferably 8.0 g/m² or less, and more preferably 7.5 g/m² or less.

<Co Coating Weight>

Further, in the diffusion alloy plating layer 103 according to the present embodiment, a coating weight of Co is within a range of 0.26 g/m² or more and 1.6 g/m² or less. Co forms the Ni—Co—Fe ternary alloy at the surface layer portion of the diffusion alloy plating layer 103 to reduce the charge transfer resistance, and impart the liquid leakage resistance (for example, alkali solubility resistance) and the slidability.

In order to obtain such an effect, it is required that when the surface of the diffusion alloy plating layer 103 is analyzed by an X-ray photoelectron spectroscopy (XPS), a Co concentration is 19.5% or more in atom %. In order to realize such a Co concentration, a coating weight of Co is required to be 0.26 g/m² or more. On the other hand, Co is expensive metal, so that an excessive Co coating weight causes increase in cost, and improvement of performance saturates. Such a phenomenon becomes noticeable when the Co coating weight exceeds 1.6 g/m², so that in the diffusion alloy plating layer 103 according to the present embodiment, the coating weight of Co is set to 1.6 g/m² or less.

In the present embodiment, the Co coating weight of the diffusion alloy plating layer 103 is preferably 0.4 g/m² or more, and more preferably 0.5 g/m² or more. Further, the Co coating weight of the diffusion alloy plating layer 103 is preferably 1.4 g/m² or less, and more preferably 1.2 g/m² or less.

<Total Coating Weight of Ni and Co>

In the diffusion alloy plating layer 103 according to the present embodiment, Ni and Co are adjusted so that the contents thereof respectively fall within the ranges as described above, and the total of the Ni coating weight and the Co coating weight (namely, the total coating weight of Ni and Co) becomes less than 9.0 g/m². When the total coating weight of Ni and Co exceeds 9.0 g/m², it becomes difficult to secure the Fe concentration at the surface of the plating layer in a state where proper grain size and mechanical properties of the base steel sheet are maintained in desirable ranges, which is not preferable. The total coating weight of Ni and Co is preferably 3.5 g/m² or more, and more preferably 5.0 g/m² or more. Further, the total coating weight of Ni and Co is preferably 8.5 g/m² or less, and more preferably 8.0 g/m² or less.

<Ratio of Ni Coating Weight and Co Coating Weight>

In the diffusion alloy plating layer 103 according to the present embodiment, a ratio of the Ni coating weight and the Co coating weight described above (more specifically, a ratio of the Co coating weight to the Ni coating weight) is preferably within a range of 0.03 or more and 0.45 or less. By setting the ratio of the Ni coating weight and the Co coating weight to fall within the aforementioned range, it becomes possible to set the thickness of the Ni—Fe alloy layer 105 to a more preferable thickness, and it is possible to realize further excellent plating adhesiveness (specifically, adhesiveness of the diffusion alloy plating layer 103) while realizing the reduction in the charge transfer resistance, the liquid leakage resistance (the alkali solubility resistance, for example), and the slidability. The ratio of the Ni coating weight and the Co coating weight is more preferably 0.05 or more. Further, the ratio of the Ni coating weight and the Co coating weight is more preferably 0.35 or less.

Here, the Ni coating weight and the Co coating weight described above can be measured by known various measuring methods. For example, the Ni coating weight and the Co coating weight can be measured by using a fluorescent X-ray intensity regarding Ni and Co measured by a fluorescent X-ray analysis method and a calibration curve indicating a relation between the fluorescent X-ray intensity and the coating weighs. Further, the ratio of the Ni coating weight and the Co coating weight can be calculated from the measured respective coating weights.

Further, it is possible to perform measurement by using, other than the fluorescent X-ray analysis method, an inductively coupled plasma (ICP) emission spectrochemical analysis method. For example, it is also possible to design such that a sample with a size of 40 mm$\phi$ is punched from an arbitrary portion thereof, a plating layer is pickled to be peeled off by an aqueous solution obtained by mixing nitric acid and pure water by a ratio of 1:1, and an ICP quantitative analysis is performed to determine the coating weights.

<Element Concentration at Surface of Diffusion Alloy Plating Layer>

When the surface of the diffusion alloy plating layer 103 according to the present embodiment is analyzed by the XPS, the plating layer 103 has Co: 19.5 to 60%, Fe: 0.5 to 30%, and Co+Fe: 20 to 70% in atom %. Note that such a composition is one represented by atom % when Ni+Co+Fe is set to 100%. When the surface of the diffusion alloy plating layer 103 is analyzed by the XPS as described above, if the Fe concentration indicates a significant value, this indicates that Fe in the base steel sheet 101 is diffused up to the surface of the diffusion alloy plating layer 103.

[Co Concentration]

When the Co concentration at the surface of the diffusion alloy plating layer is less than 19.5 atom % in the XPS analysis, it is not possible to sufficiently reduce the charge transfer resistance, and further, it is not possible to secure the alkali resistance. On the other hand, when the aforementioned Co concentration exceeds 60 atom %, the liquid leakage resistance is reduced. Further, in the surface-treated steel sheet 10 for battery containers according to the present embodiment, by making Fe diffuse up to the surface of the diffusion alloy plating layer 103, the functions of Co contributing to the reduction in the charge transfer resistance, and the imparting of the liquid leakage resistance (the alkali solubility resistance, for example), and the slidability are alternatively realized by Fe or aided by Fe, to thereby reduce the coating weight of Co. As a result of this, in the surface-treated steel sheet 10 for battery containers according to the present embodiment, the Co concentration measured by the XPS analysis can be set to 60% or less, and it is possible to reduce the manufacturing cost. The Co concentration at the surface of the diffusion alloy plating layer 103 is preferably 22 atom % or more, more preferably 25 atom % or more, and still more preferably 30 atom % or more. Further, the Co concentration at the surface of the diffusion alloy plating layer 103 is preferably 55 atom % or less, more preferably 52 atom % or less, and still more preferably 48 atom % or less.

[Fe Concentration]

When the Fe concentration at the surface of the diffusion alloy plating layer is less than 0.5 atom % in the XPS analysis, the amount of Fe diffused up to the surface of the diffusion alloy plating layer 103 becomes insufficient, and it is not possible to realize the adhesiveness of the diffusion alloy plating layer 103, the suppression of cracks of the diffusion alloy plating layer 103 during working, and the improvement of the slidability. On the other hand, when the aforementioned Fe concentration exceeds 30 atom %, the liquid leakage resistance is reduced. The Fe concentration at the surface of the diffusion alloy plating layer is preferably 2 atom % or more, more preferably 3 atom % or more, and still more preferably 4 atom % or more. Further, the Fe concentration at the surface of the diffusion alloy plating layer is preferably 27 atom % or less, more preferably 24 atom % or less, and still more preferably 20 atom % or less.

[Total Concentration of Co and Fe]

When the total concentration of Co and Fe at the surface of the diffusion alloy plating layer according to the XPS analysis is less than 20 atom %, a performance of a battery configured by a battery container that uses the surface-treated steel sheet 10 for battery containers according to the present embodiment is reduced. On the other hand, when the above-described total concentration of Co and Fe exceeds 70 atom %, the liquid leakage resistance (the alkali solubility resistance, for example) is reduced. The total concentration of Co and Fe at the surface of the diffusion alloy plating layer is preferably 23 atom % or more, and more preferably 25 atom % or more. Further, the total concentration of Co and Fe at the surface of the diffusion alloy plating layer is preferably 60 atom % or less, and more preferably 55 atom % or less.

Note that the Co concentration and the Fe concentration at the surface of the diffusion alloy plating layer are measured by the XPS, as described above. More specifically, first, in order to eliminate an influence of a contaminated layer such as an oxide film which may exist on the surface of the surface-treated steel sheet for battery containers, the surface of the surface-treated steel sheet for battery containers is sputtered by 4 nm in terms of $SiO_2$, for example, by using Ar ions. After that, an X-ray photoelectron spectrometer in which a MgK$\alpha$ ray is used as an X-ray source, may be used to measure existing amounts of Ni, Co, Fe at the sputtered surface of the surface-treated steel sheet for battery containers. The Ni concentration, the Co concentration, and the Fe concentration may be measured from an area intensity of a peak intensity of Ni2p, a peak intensity of Co2p, and a peak intensity of Fe2p, respectively. Note that the aforementioned area is corrected by a relative sensitivity factor method using a sensitivity coefficient peculiar to a device, and used for quantitative determination. The aforementioned Co concentration and Fe concentration can be specified from the obtained existing amounts of Ni, Co, Fe.

<Thickness of Ni—Fe Alloy Layer>

As will be described below in detail, in the surface-treated steel sheet 10 for battery containers according to the present embodiment, Ni plating and Co plating are sequentially performed on the base steel sheet 101, and then the formed plating layer is alloyed, to thereby form the diffusion alloy plating layer 103. For this reason, the diffusion alloy plating layer 103 of the surface-treated steel sheet 10 for battery containers according to the present embodiment has a different distribution state of the Ni element and the Co element, when compared to a case of forming Ni—Co alloy plating through a conventional means.

Figure 2:
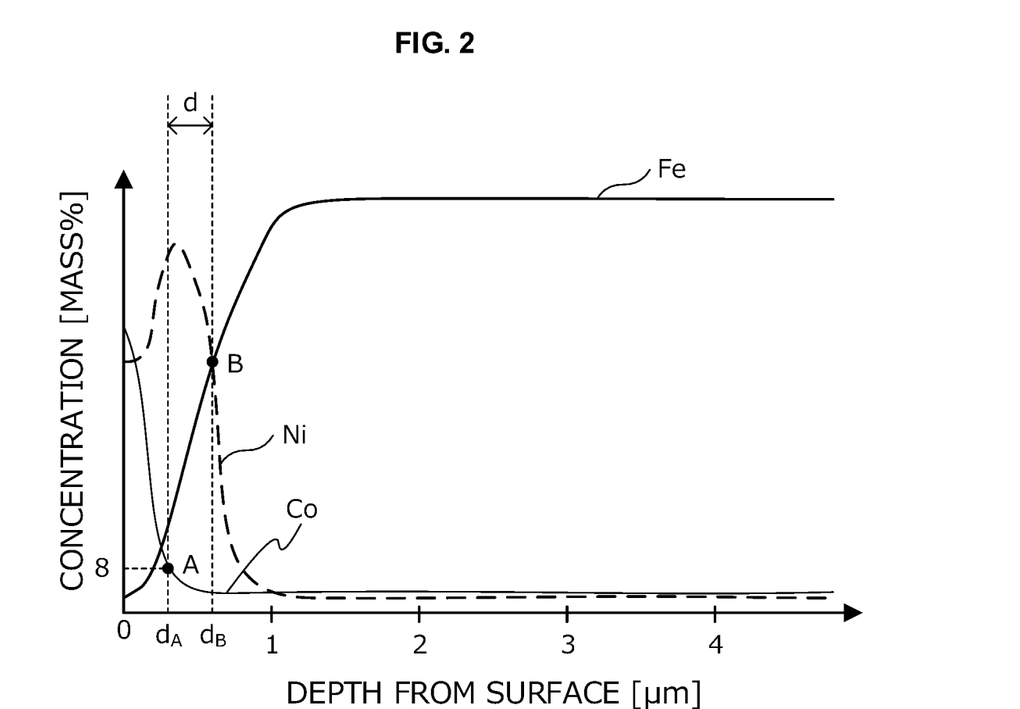
FIG. 2 is an explanatory diagram for explaining a thickness of a Ni—Fe alloy layer in the surface-treated steel sheet for battery containers according to an embodiment of the present invention.

Hereinafter, the distribution state of the Ni element and the Co element in the diffusion alloy plating layer 103 according to the present embodiment and a thickness of the Ni—Fe alloy layer 105 will be described in detail while referring to FIG. 2. FIG. 2 is an explanatory diagram for explaining the thickness of the Ni—Fe alloy layer in the surface-treated steel sheet for battery containers of the present embodiment, and it schematically illustrates an analysis result when analyzing a cross section of the diffusion alloy plating layer 103 according to the present embodiment by using a scanning electron microscope/energy dispersive X-ray spectroscopy (SEM/EDX).

In the case where Ni—Co alloy plating is performed through the conventional means, when the distribution situation of the Ni element and the Co element are measured, the concentrations of the Ni element and the Co element monotonously decrease while showing a similar decreasing tendency from the surface layer side toward the inside of the plating layer. However, in the diffusion alloy plating layer 103 according to the present embodiment, the Ni plating and the Co plating are separately performed and then the alloying is performed, so that the distribution state of the Ni element and the distribution state of the Co element show different distribution tendencies, and a state as illustrated in FIG. 2, for example, is created.

More specifically, as schematically illustrated in FIG. 2, Co has a peak of its concentration at the surface of the diffusion alloy plating layer 103, and exhibits a behavior in which the concentration thereof decreases toward the inside of the plating layer. Further, Ni has a concentration peak at an inner side of the plating layer relative to the peak position of the Co concentration, and it exhibits a behavior in which the concentration thereof decreases toward the inside of the plating layer.

In the present embodiment, when the transition of the concentration of the Co element is followed from the base steel sheet 101 side, a point at which the Co concentration is significantly observed for the first time (concretely, a point at which the concentration becomes 8 mass %) is set to a point A. Further, an intersection point between a curve indicating the transition of the concentration of the Ni element and a curve indicating the transition of the concentration of the Fe element is set to a point B. In the present embodiment, a portion from a depth $d_A$ [unit: μm] from the surface of the diffusion alloy plating layer 103 corresponding to the point A to a depth $d_B$ [unit: μm] from the surface of the diffusion alloy plating layer 103 corresponding to the point B, is set to the Ni—Fe alloy layer 105, and a difference between the depth $d_A$ and the depth $d_B$ is set to a thickness d ($d=d_B-d_A$) of the Ni—Fe alloy layer 105 as illustrated in FIG. 1A. Further, in the present embodiment, a portion corresponding to one from the surface of the diffusion alloy plating layer 103 to the depth $d_A$ is set to the Ni—Co—Fe alloy layer 107.

In the surface-treated steel sheet 10 for battery containers according to the present embodiment, the thickness d of the Ni—Fe alloy layer 105 specified as described above is within a range of 0.3 μm to 1.3 μm. Such a Ni—Fe alloy layer 105 improves the adhesiveness of the diffusion alloy plating layer 103 (adhesiveness with the base steel sheet 101), and the Ni—Fe alloy is softer than the Ni—Co—Fe alloy, so that the Ni—Fe alloy layer 105 contributes to suppress cracks of the diffusion alloy plating layer 103 during working. When the thickness d of the Ni—Fe alloy layer 105 is less than 0.3 μm, the effect of improving the adhesiveness and the effect of suppressing cracks during working as described above become insufficient. On the other hand, when the thickness d of the Ni—Fe alloy layer 105 exceeds 1.3 μm, it is not possible to make the Fe concentration at the surface of the diffusion alloy plating layer 103 to be 30 atom % or less, and further, it becomes difficult to make the crystal grain diameter of the base steel sheet 101 to be a desired size. The thickness d of the Ni—Fe alloy layer 105 is preferably 0.4 μm or more, and more preferably 0.5 μm or more. Further, the thickness d of the Ni—Fe alloy layer 105 is preferably 1.1 μm or less, and more preferably 1.0 μm or less.

Further, in the surface-treated steel sheet 10 for battery containers according to the present embodiment, when the diffusion alloy plating layer 103 is formed with the Ni coating weight and the Co coating weight as described above, the total thickness of the diffusion alloy plating layer 103 falls within a range of 0.5 pinto 1.8 μm.

Note that the concentrations [unit: mass %] in the depth direction of Ni, Co, Fe in the diffusion alloy plating layer 103 as schematically illustrated in FIG. 2, can be grasped by performing measurement on the cross section of the diffusion alloy plating layer 103 according to an energy dispersive X-ray analysis method (EDX, for example, SEM/EDX or the like). More specifically, the surface-treated steel sheet for battery containers is embedded in a resin, a cross section perpendicular to the steel sheet surface is set to an inspection surface, and the inspection surface is polished and etched by nital. After that, the diffusion alloy plating layer 103 is observed at 10000 magnifications (visual field area: 110.5 μm$^2$), and an EDX ray analysis is performed from the resin side toward the steel sheet side. At this time, an acceleration voltage is set to 15 kv, an irradiation current is set to 10 nA, a beam diameter is set to about 100 nm, a measurement pitch is set to 0.025 μm, and an aperture diameter of an objective lens is set to a diameter of 30 μm. Further, the composition (mass %) may be set to 100% in total composed of Ni, Co, Fe.

As described above, by making Fe actively diffuse from the base steel sheet into the plating layer, the surface-treated steel sheet for battery containers according to the present embodiment is excellent in not only the slidability and the cracking resistance of the plating film and the liquid leakage resistance (for example, the alkali solubility resistance) but also the charge transfer resistance. Further, since the surface-treated steel sheet for battery containers according to the present embodiment utilizes Fe as the composition of the surface layer portion of the diffusion alloy plating layer within a range of certain limitation, it is possible to suppress the usage amount of expensive Co. In the surface-treated steel sheet for battery containers according to the present embodiment, the battery performance is secured, and at the same time, the plating film is difficult to crack even when the condition under which the steel sheet is worked into the battery can is strict, so that the steel sheet can contribute to not only reduction in cost realized by stabilization of quality and improvement of yields, but also industrial growth.

The above is the detailed explanation regarding the surface-treated steel sheet for battery containers according to the present embodiment with reference to FIG. 1A to FIG. 2.

(Regarding Manufacturing Method of Surface-Treated Steel Sheet for Battery Containers)

Figure 3:
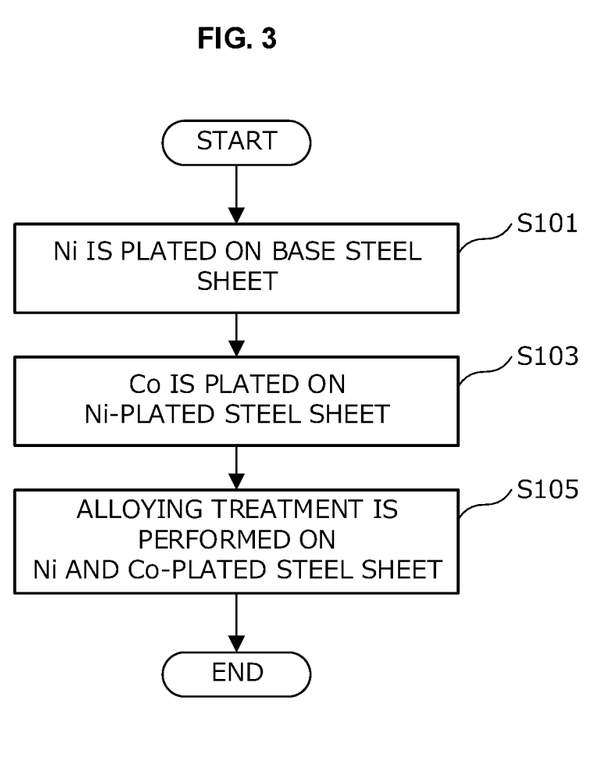
FIG. 3 is a flow chart illustrating one example of a flow of a manufacturing method of the surface-treated steel sheet for battery containers according to an embodiment of the present invention.

Subsequently, a manufacturing method of the surface-treated steel sheet for battery containers according to the present embodiment will be briefly described while referring to FIG. 3. FIG. 3 is a flow chart illustrating one example of a flow of the manufacturing method of the surface-treated steel sheet for battery containers according to the present embodiment.

As illustrated in FIG. 3, the manufacturing method of the surface-treated steel sheet for battery containers according to the present embodiment is composed of three stages, which are a step of performing plating of Ni on a base steel sheet (step S101), a step of performing plating of Co on the Ni-plated steel sheet (step S103), and a step of performing alloying treatment on the Ni and Co-plated steel sheet (step S105).

<Ni Plating Step>

The Ni plating step (step S101) is a step of using a Ni plating bath to form a Ni plating layer on a surface of the base steel sheet through electroplating. Here, as the base steel sheet, various steel sheets as described above can be used. Further, the Ni plating bath is also not particularly limited, and it is possible to use various plating baths which are normally used for Ni plating. As such a Ni plating bath, there can be cited, for example, a Watts bath, a sulfamic acid bath, a borofluoride bath, a chloride bath, or the like.

When the Ni plating layer is formed by using the Watts bath, for example, the bath having a composition of $NiSO_4.6H_2O$: 250 to 380 g/L, $NiCl_2.6H_2O$: 40 to 80 g/L, and $H_3BO_3$: 20 to 55 g/L can be used. By using such a plating bath and performing electroplating under a condition of a cathode current density of 1 to 40 $A/dm^2$ with a pH of the plating bath: 3.5 to 4.5 and a bath temperature of 45 to 55° C., the Ni plating layer can be formed.

<Co Plating Step>

In the Co plating step (step S103), Co plating is performed on the base steel sheet having the Ni plating layer formed thereon, to thereby form a Co plating layer on the Ni plating layer. The Co plating layer can also be formed through electroplating by using various plating baths which are normally used for Co plating. As such a Co plating bath, there can be cited, for example, a Co plating bath having a bath composition of $CoSO_4.7H_2O$: 240 to 330 g/L, $H_3BO_3$: 20 to 55 g/L, HCOOH: 15 to 30 g/L, and $H_2SO_4$: 0.5 to 3 g/L. By using such a plating bath and performing electroplating under a condition of a cathode current density of 1 to 40 $A/dm^2$ with a pH of the plating bath: 2 to 3 and a bath temperature of 50 to 60° C., the Co plating layer can be formed.

In the Ni plating step and the Co plating step as described above, various electroplating conditions as described above including an energization time and so on are property adjusted so that the coating weights fall within the ranges as described above and the total thickness of the Ni plating layer and the Co plating layer to be formed falls within a range of 0.3 to 1.3 μm, to thereby form the Ni plating layer and the Co plating layer with desired coating weights.

<Alloying Treatment Step>

The alloying treatment step (step S105) is a step of performing alloying treatment on the steel sheet having the Ni plating layer and the Co plating layer formed thereon to cause thermal diffusion of the Ni plating layer and the Co plating layer, to thereby form a diffusion alloy plating layer. In the manufacturing method of the surface-treated steel sheet for battery containers according to the present embodiment, heat treatment as will be described below is performed on the plated steel sheet whose Ni coating weight and Co coating weight are controlled to be the desired coating weights. As a result of this, Fe in the base steel sheet is heated and diffused up to a surface of the plating layer, and a Ni—Fe alloy layer and a Ni—Co—Fe alloy layer are formed to compose a diffusion alloy plating layer which satisfies various conditions as described above.

Such alloying treatment can be performed through a known heat treatment method, and it is preferable to use a continuous annealing method, for example. At this time, an annealing atmosphere is set to an atmosphere of, for example, $N_2$+2 to 4% $H_2$, a dew point of −30° C. or less, and an oxygen concentration of 30 ppm or less, and in such an atmosphere, a soaking temperature of the steel sheet is set to 715 to 850° C., and the steel sheet is retained at such a soaking temperature for 10 to 45 seconds.

When a hydrogen concentration is excessively low or an oxygen concentration is excessively high, or the dew point is excessively high in the annealing atmosphere, there is a possibility that the oxidation at the surface of the plating layer proceeds too much, which is not preferable. Further, greatly excessive oxygen concentration and hydrogen concentration are not preferable in terms of safety.

Although the soaking temperature of the steel sheet is set to fall within the range of 715 to 850° C. as described above, when the base steel sheet is aluminum-killed steel, the soaking temperature is more preferably 715 to 760° C., and when the base steel sheet is ultra-low carbon steel, the soaking temperature is more preferably 750 to 850° C. When the base steel sheet is the aluminum-killed steel, the soaking temperature of the steel sheet is still more preferably 715 to 750° C., and when the base steel sheet is the ultra-low carbon steel, the soaking temperature of the steel sheet is still more preferably 760 to 830° C.

The soaking temperature of the steel sheet of less than 715° C. is not preferable since it becomes difficult to diffuse Fe up to the surface of the plating layer even when the retention time is set to 45 seconds. Further, when an unannealed cold-rolled steel sheet is used as the base material, there is a possibility that recrystallization of the base material becomes insufficient. On the other hand, when the soaking temperature of the steel sheet is excessively high, there is a possibility that the surface roughening resistance is reduced due to coarsening of crystal grains of the base steel sheet, and further, the Fe concentration at the surface of the plating layer exceeds the desirable range, which is not preferable. Note that the reason why the preferable soaking temperature for annealing the steel sheet is different depending on steel types of base materials as described above, is because a recrystallization starting temperature is different depending on the steel types. The reason why the preferable soaking temperature of the ultra-low carbon steel is higher than the preferable soaking temperature of the aluminum-killed steel is because the recrystallization starting temperature of the ultra-low carbon steel is higher than the recrystallization starting temperature of the aluminum-killed steel.

The retention time at the soaking temperature of the steel sheet of less than 10 seconds is not preferable since there arises a possibility that Fe is difficult to be diffused up to the surface of the plating layer even when the soaking temperature of the steel sheet is set to 850° C., and further, there arises a possibility that the recrystallization becomes insufficient. On the other hand, the retention time at the soaking temperature of the steel sheet of greater than 45 seconds is not preferable since there is a possibility that the Fe concentration at the surface layer becomes excessively high, or there arises a possibility that the crystal grains of the base material are coarsened or it becomes necessary to provide a long and large continuous annealing facility. The retention time is preferably 15 seconds or more, and more preferably 20 seconds or more. Further, the retention time is preferably 40 seconds or less, and more preferably 30 seconds or less.

Further, a cooling process is not particularly limited, and it is only required to perform cooling to a temperature of about 100° C. by using a known cooling means.

Note that in the manufacturing method of the surface-treated steel sheet for battery containers according to the present embodiment, the steel sheet used as the base steel sheet may be one on which annealing is previously performed, but, it is economically reasonable to perform plating and alloying treatment by using an unannealed cold-rolled steel sheet as the base steel sheet. Specifically, this is because the heat treatment condition including the soaking temperature for performing the above-described annealing: 715 to 850° C. and the retention time at the soaking temperature: 10 to 45 seconds, is about the same as a continuous annealing condition of a cold-rolled steel sheet, so that if the unannealed cold-rolled steel sheet is used as the base material of the steel sheet, the alloying treatment and the annealing of the steel sheet can be completed by one process. Further, when the previously-annealed cold-rolled steel sheet is used as the base steel sheet and the alloying treatment is further performed thereon, there is a possibility that coarsening of the average crystal grain diameter of the base steel sheet occurs, to reduce the formability and the surface roughening property of the steel sheet. For this reason, to use the unannealed cold-rolled steel sheet as the base steel sheet, is preferable also from a viewpoint of controlling the average crystal grain diameter of the base steel sheet.

The above is the brief explanation regarding the manufacturing method of the surface-treated steel sheet for battery containers according to the present embodiment.

EXAMPLES

Hereinafter, the surface-treated steel sheet for battery containers according to the present invention will be concretely explained while showing examples. It should be noted that various conditions in the examples to be described below are one example of conditions adopted to confirm the feasibility and the effect of the present invention, and the present invention is not limited to the one example of conditions. The present invention can adopt various conditions as long as the object of the present invention can be achieved without departing from the gist of the present invention.

Two types of steel sheets having chemical compositions as presented below (a steel sheet A and a steel sheet B) were used as base steel sheets. A cold-rolled steel sheet A [aluminum-killed steel (sheet thickness: 0.25 mm)] and a cold-rolled steel sheet B [ultra-low carbon Ti—Nb-added steel (sheet thickness: 0.25 mm)] (both were unannealed) were subjected to degreasing and pickling according to a normal method, and after that, in Examples 1 to 12 and Comparative Examples 1 to 8, Ni electroplating was performed under treatment conditions described in 1. below, Co electroplating was then performed under treatment conditions described in 2., and heat treatment was performed under conditions described in 3., to make the plating layer to be alloyed. Detailed plating conditions and alloying treatment conditions are as shown in Table 2 below.

TABLE 1

CHEMICAL COMPOSITION OF STEEL SHEET (UNIT: MASS %, BALANCE IS COMPOSED OF Fe AND IMPURITIES)

| | C | Si | Mn | P | S | sol. Al | N | Ti | Nb |
|---|---|---|---|---|---|---|---|---|---|
| STEEL SHEET A | 0.0090 | 0.006 | 0.12 | 0.012 | 0.0088 | 0.047 | 0.0025 | — | — |
| STEEL SHEET B | 0.0016 | 0.007 | 0.10 | 0.011 | 0.0038 | 0.033 | 0.0027 | 0.016 | 0.023 |

<1. Ni Plating>
(i) Bath Conditions
$NiSO_4.6H_2O$: 340 g/L, $NiCl_2.6H_2O$: 70 g/L, $H_3BO_3$: 45 g/L, pH: 4.0
(ii) Plating conditions: bath temperature of 55° C., cathode current density of 20 A/dm$^2$ <2. Co Plating>
(i) Bath Conditions
$CoSO_4.7H_2O$: 300 g/L, $H_3BO_3$: 45 g/L, HCOOH: 23 g/L, $H_2SO_4$: 1.3 g/L, pH: 2.6
(ii) Plating Conditions: Bath Temperature of 55° C., Cathode Current Density of 20 A/Dm$^2$ Further, in Comparative Examples 9 to 11, surface-treated steel sheets were manufactured in a manner that the steel sheet A was previously subjected to annealing, which simulated box annealing, in an atmosphere of $N_2$+4% $H_2$ (dew point of −55° C.) under conditions of 640° C. and 4.5 hours, and after that, Ni plating for a lower layer and Ni—Co—Fe alloy plating for an upper layer were performed, and then alloying treatment was conducted. Also in this case, the annealed steel sheets were subjected to degreasing and pickling according to a normal method. The Ni plating was carried out according to the above-described Ni plating method. Further, the Ni—Co—Fe plating was carried out according to the following method. Further, the steel sheets after being subjected to the Ni plating and the Ni—Co—Fe plating were subjected to the alloying treatment similarly to the other examples.
(i) Bath Conditions
$NiSO_4.6H_2O$, $CoSO_4.7H_2O$: 320 g/L, $NiCl_2.6H_2O$: 20 g/L, $H_3BO_3$: 30 g/L, $CoSO_4.7H_2O$: (as appropriate), $FeSO_4.7H_2O$: (as appropriate), pH: 2.6
(ii) Plating Conditions: Bath Temperature of 60° C., Cathode Current Density of 10 A/Dm$^2$ <3. Alloying Treatment Conditions>
Atmosphere: $N_2$+2% $H_2$ atmosphere (dew point: −35° C., oxygen concentration: 20 ppm or less)
Temperature increasing rate: 10° C./second
Soaking temperature: 700 to 900° C.
Retention time: 5 to 3600 seconds
Cooling: cooled to 100° C. by $N_2$ gas The obtained various surface-treated steel sheets were analyzed and evaluated based on the following viewpoints.
<Analysis of Average Crystal Grain Diameter of Base Steel Sheet>

Regarding each of the base steel sheets of the surface-treated steel sheets manufactured in a manner as described above, a cross section of the base steel sheet was photographed by an optical microscope (ECLIPSE MR200 manufactured by NIKON CORPORATION), and the aforementioned section method was used to measure the average crystal grain diameter.

<Analysis of Coating Weights of Diffusion Alloy Plating Layer>

A sample with a diameter of 40 mm was punched from a center portion of each of the surface-treated steel sheets manufactured in a manner as described above, and coating weights of Ni and Co in the diffusion alloy plating layer were measured by using a fluorescent X-ray analysis method (ZSXPrimus II manufactured by Rigaku Corporation).

<Composition Analysis at Surface of Diffusion Alloy Plating Layer>

A sample of 10 mm×10 mm was punched from a center portion of each of the surface-treated steel sheets manufactured in a manner as described above, and a composition of the obtained sample was analyzed by XPS (PHI5600 manufactured by ULVAC-PHI, Inc.). MgKα was used as an X-ray source. A surface of the obtained sample was sputtered by 4 nm in terms of $SiO_2$ by using Ar ions to remove a contaminated layer (for example, an oxide layer or the like) which may be formed on a surface layer of the plating layer, and then a composition of a region with a diameter of 800 μm was analyzed. The composition was set to 100 atom % in total composed of Ni, Co, Fe.

<Analysis of Composition Change in Depth Direction in Diffusion Alloy Plating Layer>

A sample having a width of 10 mm in a C direction (a direction orthogonal to a rolling direction) was cut out from a center portion of each of the surface-treated steel sheets manufactured in a manner as described above. The obtained sample was embedded in a resin so that a cross section parallel to the C direction and perpendicular to a L direction (the rolling direction) can be observed, the sample was polished and subjected to nital etching, and then line analysis was conducted in the depth direction of the plating layer by using SEM•EDX. The diffusion alloy plating layer was subjected to line analysis at randomly-selected three positions from the resin side toward the steel sheet side at 10000 magnifications (visual field area: 110.5 $μm^2$) with an acceleration voltage set to 15 kV, an irradiation current set to 10 nA, a beam diameter set to about 100 nm, a measurement pitch set to 0.01 μm, and an aperture diameter of a lens set to a diameter of 30 μm. The measured elements were set to Ni, Co, Fe, and the composition was set to 100 mass % in total composed of Ni, Co, Fe. The thickness of the Ni—Fe alloy layer was measured by the aforementioned method, and an average thickness at the above-described three positions was shown in Table 2 as the thickness of the Ni—Fe alloy layer.

<Measurement of Charge Transfer Resistance of Surface>

Each of the surface-treated steel sheets manufactured in a manner as described above was kept at a constant potential for 10 days at a potential of manganese dioxide of a positive electrode (0.3V vs. Hg/HgO) at 60° C. in a 35% KOH aqueous solution, and after that, an impedance value at a frequency of 0.1 Hz was evaluated by an electrochemical impedance method. At this time, when the impedance value was less than 50Ω, it was evaluated as "evaluation point A" (pass), and when the impedance value was 50Ω or more, it was evaluated as "evaluation point B" (fail).

<Liquid Leakage Resistance Evaluation>

The liquid leakage resistance was evaluated regarding each of the surface-treated steel sheets manufactured in a manner as described above. A sample with a blank diameter of 52 mmϕ was punched from each of the surface-treated steel sheets obtained by the above-described method. Subsequently, drawing was performed three times so that the diffusion alloy plating layer was positioned on the inside of a container, and further, redrawing was performed to shape a cylindrical can with an outside diameter of 15 mm and a height of 40 mm. The cylindrical can was subjected to press work, and then a side surface portion of the can was cut out. An end face of the cut-out sample was sealed to set an exposed area to 3 $cm^2$, the sample was kept at a constant potential for 10 days at the potential of manganese dioxide of the positive electrode (0.3V vs. Hg/HgO) at 60° C. in a 35% KOH aqueous solution of 50 ml, and amounts of Ni, Co, Fe in the aqueous solution were evaluated according to the inductively coupled plasma (ICP) emission spectrochemical analysis method. At this time, a case where the total of eluted amounts of Ni, Co, Fe was less than 30 mg/L was evaluated as "evaluation point A" (pass), and a case where it was 30 mg/L or more was evaluated as "evaluation point B" (fail).

<Workability Evaluation>

In a similar manner to the case of the aforementioned liquid leakage resistance evaluation, a sample with a blank diameter of 52 mmϕ was punched from each of the surface-treated steel sheets manufactured in a manner as described above. Subsequently, drawing was performed three times so that the diffusion alloy plating layer was positioned on the inside of a container, and further, redrawing was performed to shape a cylindrical can with an outside diameter of 15 mm and a height of 40 mm. After that, a sample was cut out from a body portion, an inner surface side of the can was magnified 200 times (visual field area: 50625 $μm^2$) to perform surface EPMA mapping, to evaluate whether or not the base iron was exposed. In the surface EPMA mapping, JXA-8230 manufactured by JOEL Ltd. was used to perform analysis so that the total of Fe, Ni, Co made up 100%. From the mapping data, a case where an area of a portion having an Fe concentration of 100% was less than 1% was evaluated as "evaluation point A" (pass), and a case where the area was 1% or more was evaluated as "evaluation point B" (fail).

<Comprehensive Evaluation>

A case where all evaluation items regarding each of the charge transfer resistance, the liquid leakage resistance, and the workability evaluated in a manner as described above were "evaluation points A" was set to "comprehensive evaluation A" (pass), and a case where any of the evaluation items was evaluated as "evaluation point B" was set to "comprehensive evaluation B" (fail).

The obtained results are collectively shown in the following Table 2-1 and Table 2-2. Note that the description of "A*" in the column of "steel sheet" in the following Table 2-2 means that the steel sheet A was annealed to be used as the base steel sheet.

TABLE 2-1

TREATMENT CONDITION AND EVALUATION RESULT

| | STEEL SHEET | PLATING CONDITION | | | | ALLOYING TREATMENT CONDITION | | BASE STEEL SHEET AVERAGE CRYSTAL GRAIN DIAMETER [μm] | XPS ANALYSIS RESULT | | XPS ANALYSIS RESULT Fe + Co CONCENTRATION [at %] | EDX ANALYSIS RESULT Ni—Fe LAYER THICKNESS [μm] | EVALUATION RESULT | | | |
|---|---|---|---|---|---|---|---|---|---|---|---|---|---|---|---|---|
| | | PLATING COATING WEIGHT [g/m²] | | | | SOAKING TEMPERATURE [° C.] | RETENTION TIME [SECOND] | | Fe CONCENTRATION [at %] | Co CONCENTRATION [at %] | | | CHARGE TRANSFER RESISTANCE | LIQUID LEAKAGE RESISTANCE | WORKABILITY | COMPREHENSIVE EVALUATION |
| | | Ni | Co | Ni + Co | Co/Ni | | | | | | | | | | | |
| EXAMPLE 1 | A | 5.20 | 0.60 | 5.8 | 0.12 | 720 | 20 | 7.9 | 5.0 | 46.0 | 51.0 | 0.6 | A | A | A | A |
| EXAMPLE 2 | B | 5.20 | 0.60 | 5.8 | 0.12 | 820 | 20 | 10.9 | 25.0 | 28.0 | 53.0 | 0.7 | A | A | A | A |
| EXAMPLE 3 | A | 3.50 | 0.70 | 4.2 | 0.20 | 720 | 20 | 8.5 | 13.0 | 41.0 | 54.0 | 0.3 | A | A | A | A |
| EXAMPLE 4 | B | 3.50 | 0.70 | 4.2 | 0.20 | 820 | 20 | 10.2 | 28.0 | 32.0 | 60.0 | 0.5 | A | A | A | A |
| EXAMPLE 5 | A | 8.30 | 0.60 | 8.9 | 0.07 | 720 | 20 | 7.2 | 2.5 | 45.0 | 47.5 | 1.2 | A | A | A | A |
| EXAMPLE 6 | A | 5.20 | 1.50 | 6.7 | 0.29 | 720 | 20 | 8.3 | 4.0 | 58.0 | 62.0 | 0.5 | A | A | A | A |
| EXAMPLE 7 | B | 5.20 | 0.30 | 5.5 | 0.06 | 820 | 20 | 9.9 | 8.0 | 20.0 | 28.0 | 0.6 | A | A | A | A |
| EXAMPLE 8 | B | 4.00 | 1.20 | 5.2 | 0.30 | 820 | 20 | 10.6 | 22.0 | 45.0 | 67.0 | 0.5 | A | A | A | A |
| EXAMPLE 9 | A | 8.00 | 0.40 | 8.4 | 0.05 | 720 | 15 | 6.8 | 0.8 | 45.0 | 45.8 | 1.1 | A | A | A | A |
| EXAMPLE 10 | A | 5.20 | 0.60 | 5.8 | 0.12 | 720 | 40 | 9.8 | 25.0 | 38.0 | 63.0 | 0.8 | A | A | A | A |
| EXAMPLE 11 | B | 5.20 | 0.60 | 5.8 | 0.12 | 850 | 20 | 15.5 | 27.0 | 25.0 | 52.0 | 0.8 | A | A | A | A |
| EXAMPLE 12 | A | 3.00 | 1.60 | 4.6 | 0.53 | 720 | 20 | 8.7 | 7.0 | 60.0 | 67.0 | 0.3 | A | A | A | A |
| COMPARATIVE EXAMPLE 1 | A | 10.00 | 0.80 | 10.8 | 0.08 | 720 | 20 | 7.5 | 0.0 | 44.0 | 44.0 | 1.4 | A | A | B | B |
| COMPARATIVE EXAMPLE 2 | A | 2.50 | 0.60 | 3.1 | 0.24 | 720 | 20 | 7.4 | 34.0 | 44.0 | 78.0 | 0.2 | A | B | B | B |
| COMPARATIVE EXAMPLE 3 | A | 5.20 | 1.80 | 7.0 | 0.35 | 720 | 20 | 8.0 | 4.0 | 67.0 | 71.0 | 0.5 | A | B | A | B |
| COMPARATIVE EXAMPLE 4 | A | 5.20 | 0.20 | 5.4 | 0.04 | 720 | 20 | 8.1 | 6.0 | 15.0 | 21.0 | 0.6 | B | A | A | B |
| COMPARATIVE EXAMPLE 5 | B | 5.20 | 0.60 | 5.8 | 0.12 | 900 | 20 | 22.3 | 37.0 | 20.0 | 57.0 | 0.7 | A | B | B | B |
| COMPARATIVE EXAMPLE 6 | A | 5.20 | 0.60 | 5.8 | 0.12 | 720 | 5 | 5.3 | 0.3 | 55.0 | 55.3 | 0.4 | A | A | B | B |
| COMPARATIVE EXAMPLE 7 | A | 5.20 | 0.60 | 5.8 | 0.12 | 720 | 50 | 11.6 | 33.0 | 30.0 | 63.0 | 0.8 | A | B | B | B |
| COMPARATIVE EXAMPLE 8 | A | 7.30 | 1.60 | 8.9 | 0.22 | 700 | 3600 | 24.6 | 35.0 | 40.0 | 75.0 | — | A | B | B | B |

TABLE 2-2

TREATMENT CONDITION AND EVALUATION RESULT

| | | PLATING CONDITION | | | | | ALLOYING TREATMENT CONDITION | | BASE STEEL SHEET AVERAGE CRYSTAL GRAIN DIAMETER [μm] |
|---|---|---|---|---|---|---|---|---|---|
| | STEEL SHEET | PLATING COATING WEIGHT OF LOWER LAYER [g/m²] Ni | PLATING COATING WEIGHT OF UPPER LAYER [g/m²] | | | | SOAKING TEMPERATURE [° C.] | RETENTION TIME [SECOND] | |
| | | | Ni | Co | Ni + Co | Fe | Co/Ni | | |
| COMPARATIVE EXAMPLE 9 | A* | 6.3 | 1.00 | 1.60 | 2.6 | 0.60 | 0.22 | 720 | 30 | 15.3 |
| COMPARATIVE EXAMPLE 10 | A* | 2.0 | 5.50 | 0.31 | 5.8 | 0.25 | 0.06 | 780 | 60 | 18.3 |
| COMPARATIVE EXAMPLE 11 | A* | 4.5 | 2.60 | 0.60 | 3.2 | 4.30 | 0.23 | 780 | 60 | 18.6 |

| | XPS ANALYSIS RESULT | | | EDX ANALYSIS RESULT | EVALUATION RESULT | | | |
|---|---|---|---|---|---|---|---|---|
| | Fe CONCEN- TRATION [at %] | Co CONCEN- TRATION [at %] | Fe + Co CONCEN- TRATION [at %] | Ni—Fe LAYER THICKNESS [μm] | CHARGE TRANSFER RESISTANCE | LIQUID LEAKAGE RESISTANCE | WORK- ABILITY | COMPRE- HENSIVE EVALUA- TION |
| COMPARATIVE EXAMPLE 9 | 15.0 | 50.0 | 65.0 | 0.2 | A | B | B | B |
| COMPARATIVE EXAMPLE 10 | 6.0 | 4.5 | 10.5 | — | B | A | B | B |
| COMPARATIVE EXAMPLE 11 | 55.0 | 5.0 | 60.0 | — | A | B | B | B |

As is apparent from the above Table 2-1, Example 1 to Example 12 in each of which the Ni plating layer and the Co plating layer were formed to have proper coating weights and the proper alloying treatment was performed, exhibited excellent charge transfer resistance, excellent liquid leakage resistance, and excellent workability, and the comprehensive evaluation was the "evaluation point A".

On the other hand, in Comparative Example 1 to Comparative Example 4 in each of which the Ni coating weight or the Co coating weight was out of the proper range, the evaluation item of at least any of the charge transfer resistance, the liquid leakage resistance, and the workability was the "evaluation point B", and the comprehensive evaluation was also the "evaluation point B". Further, also in Comparative Example 5 to Comparative Example 8 in each of which the Ni coating weight and the Co coating weight were within the proper ranges but the proper alloying treatment was not performed, the evaluation item of at least any of the charge transfer resistance, the liquid leakage resistance, and the workability was the "evaluation point B", and the comprehensive evaluation was also the "evaluation point B".

Further, Comparative Examples 9 to 11 shown in Table 2-2 are results of verifying cases where previously-annealed base steel sheets were subjected to Ni plating and Ni—Co—Fe plating and subjected to alloying by heat treatment, similarly to the case exemplified in Patent Document 5. In this case, the evaluation items of the liquid leakage resistance and the workability became the "evaluation point B", and the comprehensive evaluation was also the "evaluation point B". Further, each of the steel sheets had a coarse crystal grain diameter as aluminum-killed steel, and a situation where desirable characteristics obtained when using the aluminum-killed steel as the base material were somewhat impaired, was confirmed.

As described above, it was clarified that in the surface-treated steel sheet for battery containers according to the present invention, the plating film is difficult to crack even when the condition under which the steel sheet is worked into the battery can is strict, so that it is possible to exhibit stable battery characteristics and liquid leakage resistance.

In the foregoing, the preferred embodiments of the present invention have been described in detail while referring to the attached drawings, but, the present invention is not limited to such examples. It is apparent that a person ordinary skilled in the art to which the present invention pertains is able to devise various variation or modification examples within the scope of the technical spirit described in the claims, and it should be understood that such examples belong to the technical scope of the present invention as a matter of course.

EXPLANATION OF CODES

10 Surface-treated steel sheet for battery containers
101 Base steel sheet
103 Diffusion alloy plating layer
105 Ni—Fe alloy layer
107 Ni—Co—Fe alloy layer

What is claimed is:
1. A surface-treated steel sheet for battery containers, comprising
   a Ni—Co—Fe—based diffusion alloy plating layer on at least one surface of a base steel sheet, wherein:
   the diffusion alloy plating layer is consisted of a Ni—Fe alloy layer and a Ni—Co—Fe alloy layer, which are arranged sequentially from the base steel sheet side;
   the diffusion alloy plating layer has a Ni coating weight within a range of 3.0 g/m² or more and less than 8.74 g/m² and a Co coating weight within a range of 0.26 g/m² or more and 1.6 g/m² or less, with a total of the Ni coating weight and the Co coating weight being less than 9.0 g/m²;

when a surface of the diffusion alloy plating layer is analyzed by an X-ray photoelectron spectroscopy, Co: 19.5 to 60%, Fe: 0.5 to 8%, and Co+Fe: 20 to 68% in atom % are satisfied; and a thickness of the Ni—Fe alloy layer is within a range of 0.3 to 1.3 µm.

2. The surface-treated steel sheet for battery containers according to claim 1, wherein a ratio of the Co coating weight to the Ni coating weight in the diffusion alloy plating layer is within a range of 0.03 to 0.45.

3. The surface-treated steel sheet for battery containers according to claim 1, wherein an average crystal grain diameter of the base steel sheet is within a range of 6 to 20 µm.

4. The surface-treated steel sheet for battery containers according to claim 2, wherein an average crystal grain diameter of the base steel sheet is within a range of 6 to 20 µm.

5. A manufacturing method of the surface-treated steel sheet for battery containers according to claim 1, comprising:

a Ni plating step of using a predetermined Ni plating bath to form a Ni plating layer on at least one surface of a base steel sheet;

a step of using a predetermined Co plating bath to form a Co plating layer on the base steel sheet having the Ni plating layer formed thereon; and an alloying treatment step of forming a diffusion alloy plating layer by making the base steel sheet having the Co plating layer and the Ni plating layer formed thereon to be subjected to alloying treatment of performing soaking for 10 to 45 seconds in an atmosphere of $N_2$+2 to 4% $H_2$ and in a temperature range of 715 to 850° C., wherein:

a Ni coating weight in the Ni plating layer is set to fall within a range of 3.0 g/m² or more and less than 8.74 g/m² and a Co coating weight in the Co plating layer is set to fall within a range of 0.26 g/m² or more and 1.6 g/m² or less, with a total of the Ni coating weight and the Co coating weight being set to less than 9.0 g/m²; and a total thickness of the Ni plating layer and the Co plating layer is set to fall within a range of 0.3 to 1.3 µm.

6. The manufacturing method of the surface-treated steel sheet for battery containers according to claim 5, wherein a ratio of the Co coating weight to the Ni coating weight is set to fall within a range of 0.03 to 0.45.

7. The manufacturing method of the surface-treated steel sheet for battery containers according to claim 5, wherein an unannealed cold-rolled steel sheet is used as the base steel sheet.

8. The manufacturing method of the surface-treated steel sheet for battery containers according to claim 6, wherein an unannealed cold-rolled steel sheet is used as the base steel sheet.

* * * * *